Patented May 18, 1954

2,678,950

UNITED STATES PATENT OFFICE 2,678,950

PROCESS OF PRODUCING ACROLEIN ACETALS

Donald R. Myers, Barney J. Magerlein, and Glenn W. Staffen, Kalamazoo, Mich., assignors to The Upjohn Company, Kalamazoo, Mich., a corporation of Michigan No Drawing. Application August 14, 1950, Serial No. 179,382

14 Claims. (Cl. 260—615)

This invention relates to the production of acetals of $\alpha,\beta$-unsaturated aliphatic aldehydes, and in particular to a method for the production of acrolein acetals from acrolein and aliphatic alcohols. It relates particularly to the use of sulfo acids as catalysts for such condensation reactions.

The olefinic double bond of acrolein,

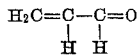

is much more reactive, due to its conjugation with the carbonyl of the aldehyde group, than an ordinary isolated double bond. The double bond in acrolein is as reactive toward most carbonyl reagents as the carbonyl group itself. Thus, with but few exceptions, e. g., Grignard reagents those reagents which react with the aldehyde group of acrolein also react with the carbon-carbon double bond to form a propionaldehyde derivative instead of the desired acrolein derivative. Whether the saturation of the carbon-carbon double bond results from a direct addition to the double bond or from an initial reaction with the aldehyde group followed by a rearrangement is of little significance, since the catalysts which promote reactions with the aldehyde function of acrolein are the same catalysts which promote addition reactions of the double bond and rearrangement of aldehyde addition products.

The difficulty of direct preparation from acrolein of acrolein derivatives in which the carbon-carbon double bond function remains intact during the reaction, is manifest by the fact that, although acrolein has been known for over one hundred years, and methods for the direct preparation of acetals have been investigated during the past fifty years, the best yields reported for the direct reaction of acrolein and an aliphatic alcohol to produce an acetal of acrolein are not higher than about thirty percent of the theoretical. F. P. Pingert, Organic Syntheses, vol. 25, page 1, New York, John Wiley and Sons (1945), reports a yield of from 24 to 30 percent of acrolein acetal and 21 to 26 percent of $\beta$-ethoxypropionaldehyde acetal by reaction of acrolein and ethanol in the presence of hydrochloric acid.

The difficulty of the direct preparation of acrolein acetals is so well recognized in the art, that attempts have been made to do indirectly what was difficult to do directly. Procedures have been proposed whereby the carbon-carbon double bond is protected during the acetal formation by the use of reagents which produce a saturated or propionic aldehyde. After the acetal is formed by known procedures for saturated aldehydes, the carbon-carbon double bond is regenerated by removal of the protective group. However, wide experience with such procedures has shown that they offer no advantages over direct methods for making acetals of acrolein as the yields are likewise low and the products of poor quality.

Acrolein and acrolein diacetate are readily available, but at the present time no acetal of acrolein is commercially available, which indicates that the available methods for the production of acrolein acetals are unsuitable for commercial production.

It has been found that acetals of acrolein can be prepared in good yields from acrolein and lower aliphatic monohydric alcohols by heating a mixture of acrolein, a lower monohydric aliphatic alcohol, and an inert, water-immiscible organic solvent at temperatures between about 25 and 50 degrees centigrade in the presence of about 0.001 to 0.010 mole percent of a sulfoacid (based on the acrolein) while continuously removing the water from the reaction zone as it is formed during the course of the reaction. This corresponds to an amount of approximately 2 to 20 milligrams of paratoluenesulfonic acid monohydrate per mole of acrolein. The quantity of catalyst employed is quite critical. When less than 0.001 mole percent is used, the reaction is so slow that much of the acrolein polymerizes, thus making it unavailable, while if more than 0.010 mole percent is used, a competing reaction sets in to form appreciable quantities of an acetal of a $\beta$ alkoxypropionaldehyde.

Below a temperature of 25 degrees centigrade the reaction rate is so slow that the process is uneconomical, while above 50 degrees centigrade, undesirable amounts of the acetals of a $\beta$ alkoxypropionaldehyde are formed, thus decreasing the amount of acrolein acetal which can be obtained. A preferred temperature range is between about 25 degrees centigrade and about 35 degrees centigrade, as it is in this range that optimum yields of acetal are obtained with a minimum of propionaldehyde derivatives.

The water formed during the course of the reaction is conveniently removed as it is formed by its distillation as an azeotropic mixture with a water-immiscible, inert organic liquid. As some alcohol and acrolein co-distill with the water and reaction solvent, a preferred procedure is to separate the organic phase and return it to the reaction zone. Since a slight amount of alcohol and acrolein are dissolved in the water which is separated from the organic phase, a preferred form of the invention comprises continuing the reaction until somewhat more than the theoretical volume of aqueous phase has been collected, a volume of about 130 percent of the calculated stoichiometrical amount being preferred. Suitable apparatus for the continuous separation of water and return of the organic phase to the reaction mixture is the phase separator illustrated in Harold J. Lucas and David Pressman, "Principles and Practices of Organic Chemistry," John Wiley and Sons, New York, 1949, page 249, and the automatic separator (with drying chamber to free the organic solvent of dissolved water by contact with silica gel or other solid dehydrating agents) illustrated in "Organic Syntheses," Collective Volume I, Second Ed., Edited by A. H. Blatt, John Wiley and Sons, New York, 1941, page 261.

Among the water-immiscible, inert organic liquids which can be used are hydrocarbons and halogenated hydrocarbons such as benzene, toluene, xylenes, ethylene dichloride, methylene dichloride, carbon tetrachloride, pentanes, hexanes, heptanes and the like. When the process is conducted under a reduced (subatmospheric) pressure, the inert, water-immiscible organic liquid need not boil below fifty degrees centigrade. However, for convenience and ability to operate at atmospheric pressures, an organic liquid which boils below fifty degrees centigrade is preferred, such as Skellysolve F, which is a petroleum fraction containing a predominance of pentanes, boiling at 35 degrees centigrade and distilling between 35 and 60 degrees centigrade.

Various sulfo-acids heretofore used in the formation of acetals have been found to be satisfactory in the preparation of acetals of acrolein. Suitable catalysts include sulfuric acid, sulfamic acid, the aliphatic sulfonic acids, such as methanesulfonic and ethanesulfonic acids and the aromatic sulfonic acids such as benzenesulfonic, toluenesulfonic, napthalenesulfonic acids, and the like.

When carrying out the formation of acrolein acetals using para-toluenesulfonic acid as a catalyst and a suitable solvent, the maximum yield obtainable in the minimum reaction time is obtained when a ratio of two moles of alcohol, one mole of acrolein and 500 milliliters of solvent is used. The reaction time cannot be stated accurately, as it is greatly dependent upon the rate of reflux, the efficiency of the water-separating means, the reaction temperature, and the inert water-immiscible organic solvent used. It is best determined by observing the amount of aqueous phase which is collected by the water-separating means, and stopping the reaction when the optimum amount has been collected; in general, the time required is approximately 24 to 30 hours for most alcohols, when the reaction is conducted in the preferred temperature range.

The acetal thus formed is conveniently isolated by removing the catalyst, preferably by neutralization with a mild base such as sodium bicarbonate or, more preferably, copper carbonate, and fractionally distilling the liquid to recover the inert solvent, alcohol and unreacted acrolein. The residue, which consists essentially of acrolein acetal, can be further purified if desired by fractional distillation at either atmospheric or reduced pressure.

When prepared as described above, various acetals of acrolein have been obtained in conversions as high as 82 percent of theory, and, as the recovered components can be reused in subsequent reactions, the yield is practically quantitative.

Among the monohydric alcohols which can be used in the method of the present invention to prepare acetals of acrolein are methanol, ethanol, n-propanol, isopropanol, n-butanol, n-octanol, isobutanol, isopentanol, isooctanol, tertiary-butanol, and the like.

Certain of the acetals of acrolein which can be prepared by the method of this invention are new chemical compounds having valuable properties as solvents and as intermediates for the production of useful polymers and in chemical syntheses.

The following examples are given by way of illustration only and are not to be construed as limiting.

*Example 1.—Acrolein diethyl acetal,*
$H_2C=CH-CH(OC_2H_5)_2$

A mixture of 60.5 grams (approximately 1.08 moles) of commercial acrolein, 92.0 grams (approximately 2.0 moles) of absolute ethanol, 450 milliliters of Skellysolve F and 3 milligrams (approximately 0.0000158 mole) of paratoluenesulfonic acid monohydrate was placed in a still-pot equipped with an efficient fractionating column and a continuous water or phase separator, and refluxed for 24 hours, during which time 26.5 milliliters of aqueous phase was collected in the water separator, the vapor temperature of the boiling liquid remaining at 29 degrees centigrade during the entire course of the reaction. The solution was then cooled, 0.5 gram of copper carbonate added, and the solution stirred for fifteen minutes, at which time it had become neutral. The solution was then filtered and fractionally distilled at atmospheric pressure to obtain 81.3 grams (63 percent of theory) of acrolein diethyl acetal, which boiled at 120 to 124 degrees centigrade.

*Example 2.—Acrolein diethyl acetal*

A mixture of 56 grams (approximately 1.0 mole) of commercial acrolein, 92.0 grams (approximately 2.0 moles) of absolute ethanol, 600 milliliters of Skellysolve F and 3 milligrams (approximately 0.0000158 mole) of para-toluenesulfonic acid monohydrate was placed in a still-pot equipped with an efficient fractionating column, a continuous or automatic water or phase separator, and a tube containing 75 grams of silica gel to dry the distillate before it was returned to the reaction vessel. After this mixture had been refluxed for 39 hours, it was cooled, neutralized with copper carbonate as previously described, filtered, and the filtrate fractionally distilled to obtain 106.2 grams (82 percent of theory) of acrolein diethyl acetal, which boiled at 114 to 124 degrees centigrade.

*Comparative Example 1.—Acrolein diethyl acetal*

In a manner essentially as described in Example 1 but using one mole (56 grams) of acrolein, acrolein diethyl acetal was prepared from acrolein and ethanol using 150 milliliters of Skellysolve F and the following catalysts per mole of aldehyde:

A. Thirty milligrams (approximately 0.00031 mole) of sulfamic acid resulting in a 26 percent yield of acetal after heating under reflux for eleven hours.

B. Thirty milligrams (approximately 0.00013 mole) of naphthalene-β-sulfonic acid monohydrate resulting in a 43 percent yield of acetal after only 16 hours of heating under reflux.

The foregoing results illustrate the effects on yield produced by using either too little or too much catalyst.

*Example 3.—Other acrolein acetals*

In a manner essentially as described in Example 1, the following acetals were prepared from acrolein, the corresponding alcohol, Skellysolve F, and the specified proportion (0.00158 mole percent of the acrolein in each case) of para-toluenesulfonic acid monohydrate:

A. Acrolein dimethyl acetal boiling at 87.5 to 88 degrees centigrade was obtained in a conversion of twenty percent of theory from one mole of acrolein, two moles of absolute methanol, 500 milliliters of Skellysolve F and three milligrams (approximately 0.0000158 mole) of para-toluenesulfonic acid monohydrate, after heating under reflux for 22 hours.

B. Acrolein di-isopropyl acetal boiling at 68.5 to 69.5 degrees centigrade at 50 millimeters of pressure was obtained in a 14.5 percent conversion from one mole of acrolein, two moles of isopropanol, and three milligrams of paratoluenesulfonic acid monohydrate after heating under reflux for 35.5 hours.

C. Acrolein di-normal-propyl acetal boiling at 85 to 87 degrees centigrade at 46 millimeters of pressure was obtained in a conversion of 65 percent of theory from two moles of normal-propanol, one mole of acrolein, three milligrams of para-toluenesulfonic acid monohydrate and 500 milliliters of Skellysolve F, after heating under reflux for 27 hours.

D. Acrolein di-normal-butyl acetal boiling at 109–120 degrees centigrade at 39 millimeters pressure was obtained in a conversion of 74 percent of theory from one mole of acrolein, two moles of normal butanol, three milligrams of para-toluenesulfonic acid monohydrate and 500 milliliters of Skellysolve F, after heating under reflux for 13 hours.

E. Acrolein di-isobutyl acetal boiling at 103–105 degrees centigrade at 61 millimeters pressure was obtained in a conversion of 59 percent of theory from one mole of acrolein, two moles of isobutanol, 500 milliliters of Skellysolve F and three milligrams of para-toluenesulfonic acid monohydrate, after heating under reflux for 26 hours.

*Example 4.—Acrolein diethyl acetal*

A mixture of one mole of acrolein, two moles of absolute ethanol, 580 milliliters of methylene chloride and three milligrams (approximately 0.0000158 mole) of para-toluenesulfonic acid monohydrate was placed in the apparatus described in Example 1 and heated under reflux for 22 hours, then an additional three milligrams of para-toluenesulfonic acid monohydrate was added and heating continued for a total of 72 hours. Upon working up to the reaction mixture in the usual manner, 51.9 grams (40 percent of theory) of acrolein diethyl acetal was obtained, which boiled at 118 to 119 degrees centigrade.

Modifications of the invention other than described in the foregoing examples will be apparent to those skilled in the art and such modifications are intended to be included within the scope of the appended claims.

We claim:

1. A process for the production of an acetal of acrolein which comprises heating acrolein and a lower aliphatic alcohol in the presence of a catalytic amount of a sulfo acid, selected from the group consisting of sulfuric acid, sulfamic acid, aliphatic sulfonic acids and aromatic sulfonic acids, the catalyst being present in amount between about 0.001 and about 0.01 mole per 100 moles of acrolein, at a temperature between approximately 25 and approximately fifty degrees centigrade, while removing the water formed during the condensation from the reaction mixture continuously as formed, and subsequently recovering the acrolein acetal from the reaction mixture.

2. A process as defined in claim 1 wherein the water is removed by azeotropic distillation with an inert water-immiscible organic liquid.

3. A process as defined in claim 1 wherein the water formed during the condensation is removed by contact with silica gel.

4. A process as defined in claim 1 wherein the sulfo acid is an aromatic sulfonic acid.

5. A process for the production of an acetal of acrolein wherein acrolein and a lower aliphatic alcohol are condensed which comprises heating together acrolein and the alcohol at a temperature between approximately 25 and approximately 50 degrees centigrade in the presence of an amount of a sulfo acid, selected from the group consisting of sulfuric acid, sulfamic acid, aliphatic sulfonic acids and aromatic sulfonic acids, the catalyst being present in an amount within the range of 0.001 to 0.010 mole per 100 moles of acrolein and an inert, water-immiscible organic liquid while continuously removing the water from the reaction zone in the form of an azeotropic mixture with the inert organic liquid as it is formed during the course of the reaction and subsequently recovering the acrolein acetal.

6. A process as defined in claim 5 wherein the inert, water-immiscible organic liquid is a petroleum hydrocarbon fraction containing a predominance of pentanes.

7. A process as defined in claim 5 wherein the sulfo acid is an aromatic sulfonic acid.

8. A process for the production of an acetal of acrolein wherein acrolein and a lower aliphatic alcohol are condensed, which comprises heating together acrolein and the alcohol at a temperature between approximately 25 and approximately fifty degrees centigrade in the presence of a catalytic amount of a sulfo acid selected from the group consisting of sulfuric acid, sulfamic acid, aliphatic sulfonic acids and aromatic sulfonic acids, said catalyst being present in an amount within the range of about 0.001 to 0.01 mole per 100 moles of acrolein, in the presence of an inert, water-immiscible organic liquid, while continuously removing the water formed during the course of the reaction from the reaction zone by distillation with the organic liquid, separating the aqueous and organic phases of the distillate, drying the organic phase by contact with silica gel, returning the dried organic phase to the reaction mixture, and recovering the acrolein acetal.

9. A process for the preparation of acrolein diethyl acetal which comprises heating a mixture of acrolein, ethyl alcohol, an inert water-immiscible organic solvent and between approximately 0.001 and approximately 0.010 mole of an aromatic sulfonic acid per 100 moles of acrolein at a temperature of approximately 35 degrees centigrade while continuously removing the water as it is formed during the course of the reaction and subsequently recovering substantially pure acrolein diethyl acetal.

10. A process as defined in claim 9 wherein the aromatic sulfonic acid is para-toluenesulfonic acid.

11. A process as defined in claim 9 wherein the inert, water-immiscible organic solvent is a petroleum hydrocarbon fraction containing a predominance of pentanes.

12. A process for the preparation of acrolein dipropyl acetal which comprises heating a mixture of acrolein, propyl alcohol, an inert, water-immiscible organic solvent and between approximately 0.001 and approximately 0.010 mole of an aromatic sulfonic acid per 100 moles of acrolein at a temperature of about 35 degrees centigrade while continuously removing the water as it is formed during the course of the reaction, and recovering substantially pure acrolein dipropyl acetal.

13. A process for the preparation of acrolein dibutyl acetal which comprises heating a mixture of acrolein, butyl alcohol, an inert water-immiscible organic solvent, and between approximately 0.001 and approximately 0.010 mole of an aromatic sulfonic acid per 100 moles of acrolein at a temperature of about 35 degrees centigrade while continuously removing the water as it is formed during the course of the reaction, and recovering substantially pure acrolein dibutyl acetal.

14. A process for the preparation of acrolein dimethyl acetal which comprises heating a mixture of acrolein, methyl alcohol, an insert water-immiscible organic solvent and between approximately 0.001 and approximately 0.010 mole of an aromatic sulfonic acid per 100 moles of acrolein at a temperature of about 35 degrees centigrade while continuously removing the water as it is formed during the course of the reaction, and recovering substantially pure acrolein dimethyl acetal.

References Cited in the file of this patent

UNITED STATES PATENTS

| Number | Name | Date |
|---|---|---|
| 1,850,836 | Guinot | Mar. 22, 1932 |
| 2,501,144 | Saunders | Mar. 21, 1950 |
| 2,535,458 | Robeson | Dec. 26, 1950 |

FOREIGN PATENTS

| Number | Country | Date |
|---|---|---|
| 283,112 | Great Britain | Nov. 15, 1928 |
| 553,177 | Germany | June 22, 1932 |